United States Patent
Wang et al.

(10) Patent No.: US 12,545,113 B2
(45) Date of Patent: Feb. 10, 2026

(54) METHOD AND DEVICE FOR SCREEN PROJECTION IN VEHICLE

(71) Applicant: PATEO CONNECT+(Nanjing) Co., Ltd., Nanjing (CN)

(72) Inventors: Xiaohua Wang, Nanjing (CN); Hongren Shi, Nanjing (CN)

(73) Assignee: PATEO CONNECT+(Nanjing) Co., Ltd., Nanjing (CN)

( * ) Notice: Subject to any disclaimer, the term of this patent is extended or adjusted under 35 U.S.C. 154(b) by 87 days.

(21) Appl. No.: 18/671,322

(22) Filed: May 22, 2024

(65) Prior Publication Data

US 2024/0308344 A1    Sep. 19, 2024

Related U.S. Application Data

(63) Continuation of application No. PCT/CN2022/073990, filed on Jan. 26, 2022.

(30) Foreign Application Priority Data

Nov. 23, 2021  (CN) .......................... 202111398566.0

(51) Int. Cl.
*B60K 35/80* (2024.01)

(52) U.S. Cl.
CPC ........ *B60K 35/80* (2024.01); *B60K 2360/151* (2024.01); *B60K 2360/563* (2024.01); *B60K 2360/66* (2024.01)

(58) Field of Classification Search
CPC .............. B60K 35/80; B60K 2360/151; B60K 2360/563; B60K 2360/66; B60K 35/00; G06F 3/14; G06F 3/1454; H04N 21/431
See application file for complete search history.

(56) References Cited

U.S. PATENT DOCUMENTS

2010/0117810 A1    5/2010  Hagiwara et al.
2019/0291578 A1*   9/2019  Kumon ................. B60K 35/656

FOREIGN PATENT DOCUMENTS

| CN | 112118558 A | 12/2020 |
| CN | 113438747 A | 9/2021 |
| CN | 113590061 A | 11/2021 |

OTHER PUBLICATIONS

The World Intellectual Property Organization (WIPO) International Search Report for PCT/CN2022/073990 Aug. 23, 2022 5 Pages (including translation).

\* cited by examiner

*Primary Examiner* — Yuen Wong
(74) *Attorney, Agent, or Firm* — ANOVA LAW GROUP, PLLC (57) ABSTRACT

A method for screen projection in vehicle includes displaying first screen projection data sent from connected first mobile terminals in sub-areas on a display screen; in response to receiving a connection request from a second mobile terminal, establishing a connection with the second mobile terminal; receiving second screen projection data sent from the second mobile terminal; determining whether any target screen projection data having a same data type as the second screen projection data exists in the first screen projection data; in response to the target screen projection data being determined, assigning a target sub-area corresponding to the target screen projection data to the second mobile terminal to project the second screen projection data sent from the second mobile terminal; and in response to no target screen projection data being determined, adding a new sub-area on the display screen to screen project the second screen projection data.

20 Claims, 4 Drawing Sheets

METHOD AND DEVICE FOR SCREEN PROJECTION IN VEHICLE

CROSS-REFERENCE TO RELATED APPLICATION

This application claims priority to International Application No. PCT/CN2022/073990, filed on Jan. 26, 2022, which claims priority to Chinese Patent Application No. 202111398566.0, filed with the China National Intellectual Property Administration (CNIPA) on Nov. 23, 2021, the entire contents of all of which are [is] incorporated herein by reference.

TECHNICAL FIELD

The present disclosure relates to the technical field of in-vehicle information systems and, more particularly, to a method and a device for screen projection in vehicle.

BACKGROUND

With the rise of interconnected devices and the Internet, the Internet of Everything enables two seemingly unrelated devices to be interconnected, so the interaction and management between connected devices have become particularly important. At present, connection between a vehicle and a mobile terminal has attracted the attention of those skilled in the art. After the vehicle and the mobile terminal are connected, contents on a mobile terminal display interface may be projected to a display screen of the vehicle. For example, a navigation interface, and a music player interface, etc. of the mobile terminal may be projected to the display screen of the vehicle.

Currently, a method for screen projection after an in-vehicle information system has been connected to multiple mobile terminals is often relatively simple. Specifically, the method may include: when the interface of at least one mobile terminal has been projected to the display screen of the in-vehicle information system and another mobile terminal becomes connected to the in-vehicle information system, a new sub-area is cut out directly on the display screen of the in-vehicle information system for the screen projection of the newly connected mobile terminal. As the number of mobile terminals connected to the in-vehicle information system grows substantially, the screen projection of each connected mobile terminal may have an undesired display quality.

SUMMARY

One aspect of the present disclosure provides a method for screen projection in vehicle. The method includes: displaying first screen projection data sent from connected first mobile terminals in sub-areas on a display screen in vehicle, wherein a number of sub-areas divided on the display screen is equal to a number of the first mobile terminals; in response to receiving a connection request from a second mobile terminal, establishing a connection with the second mobile terminal; receiving second screen projection data sent from the second mobile terminal; determining whether any target screen projection data having a same data type as the second screen projection data exists in the first screen projection data; in response to the target screen projection data being determined, assigning a target sub-area corresponding to the target screen projection data to the second mobile terminal to screen project the second screen projection data sent from the second mobile terminal; and in response to no target screen projection data being determined, adding a new sub-area on the display screen to screen project the second screen projection data.

Another aspect of the present disclosure provides a device for screen projection in vehicle. The device includes a memory storing computer instructions and a processing component coupled to the memory. When being executed by the processing component, the computer instructions cause the processing component to: display first screen projection data sent from connected first mobile terminals in sub-areas on a display screen in vehicle, wherein a number of sub-areas divided on the display screen is equal to a number of the first mobile terminals; in response to receiving a connection request from a second mobile terminal, establish a connection with the second mobile terminal; receive second screen projection data sent from the second mobile terminal; determine whether any target screen projection data having a same data type as the second screen projection data exists in the first screen projection data; in response to the target screen projection data being determined, assign a target sub-area corresponding to the target screen projection data to the second mobile terminal to screen project the second screen projection data sent from the second mobile terminal; and in response to no target screen projection data being determined, add a new sub-area on the display screen to screen project the second screen projection data.

Another aspect of the present disclosure provides a non-volatile computer-readable storage medium storing computer instruction. When being executed by a processing component, the computer instructions cause the processing component to perform: displaying first screen projection data sent from connected first mobile terminals in sub-areas on a display screen in vehicle, wherein a number of sub-areas divided on the display screen is equal to a number of the first mobile terminals; in response to receiving a connection request from a second mobile terminal, establishing a connection with the second mobile terminal; receiving second screen projection data sent from the second mobile terminal; determining whether any target screen projection data having a same data type as the second screen projection data exists in the first screen projection data; in response to the target screen projection data being determined, assigning a target sub-area corresponding to the target screen projection data to the second mobile terminal to screen project the second screen projection data sent from the second mobile terminal; and in response to no target screen projection data being determined, adding a new sub-area on the display screen to screen project the second screen projection data.

DETAILED DESCRIPTION OF THE EMBODIMENTS

The embodiments of the present disclosure will be illustrated by various examples below, and those skilled in the art can easily understand other advantages and effects of the present disclosure from the description disclosed in the specification. Although the description of the disclosure will be presented in conjunction with preferred embodiments, it is not intended that the features of the disclosure be limited to these embodiments only. On the contrary, the objective of describing the disclosure in conjunction with the various embodiments is to cover other options or modifications that may be extended based on the claims of the present disclosure. The following description contains numerous details to provide a thorough understanding of the present disclosure. The disclosure may also be practiced without certain details. In addition, certain details may be omitted from the description to focus on key aspects of the present disclosure.

In the description of the present disclosure, it should be noted that unless otherwise specified and limited, the terms "installation", "connection" and "connection" should be understood in a broad sense. For example, it may be a fixed connection, a detachable connection, or an integral connection. It may be a mechanical connection or an electrical connection. It may be a direct connection or an indirect connection through an intermediary, and it may be an internal connection between two components. Those of ordinary skill in the art can understand specific meanings of the above terms in the present disclosure in specific situations.

In addition, the terms "up", "down", "left", "right", "top", "bottom", "horizontal", and "vertical" used in the following description should be understood as orientation shown in the accompanying drawings. The relative terms are used for convenience of description only, and do not imply that a device described therein must be manufactured or operated in a specific orientation, and thus should not be construed as limiting the present disclosure.

It should be understood that although the terms "first", "second", "third", etc. may be used herein to describe various components, regions, layers and/or sections, these components, regions, layers and/or sections should not be limited by these terms, and these terms are merely used to distinguish different components, regions, layers and/or sections. Thus, a first component, region, layer and/or section discussed below could also be described as a second component, region, layer and/or section without departing from the scope of the embodiments of the present disclosure.

Figure 1:
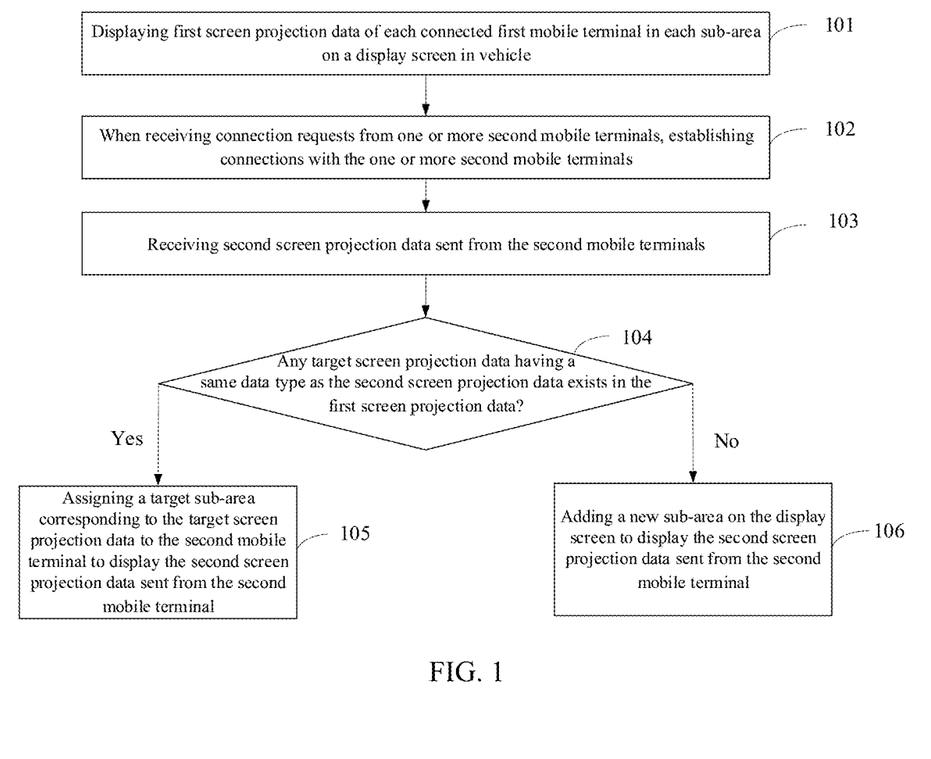
FIG. 1 is a flowchart of an exemplary method for screen projection in vehicle according to some embodiments of the present disclosure.

FIG. 1 is a flowchart of an exemplary method for screen projection in vehicle according to some embodiments of the present disclosure. As shown in FIG. 1, the method includes the following processes.

At 101, first screen projection data of each connected first mobile terminal is displayed in each sub-area on a display screen in vehicle.

The method provided by the present disclosure may be applied to an in-vehicle information system mounted on a vehicle. In some embodiments, the in-vehicle information system may connect with a plurality of mobile terminals. The number of the sub-areas cut out on the display screen is equal to the number of the connected first mobile terminals.

When performing the screen projection, the in-vehicle information system determines the number N of the connected first mobile terminals and divides a screen projection area on the display screen into the N number of the sub-areas. The in-vehicle information system displays the first screen projection data sent from each connected first mobile terminal in corresponding sub-area, respectively. Each connected first mobile terminal corresponds to one sub-area.

Dividing the screen projection area on the display screen in the method for the screen projection into the N number of the sub-areas facilitates simultaneous screen projection of the screen projection data of the plurality of connected first mobile terminals, thereby diversifying the screen projection of the screen projection data.

In some embodiments, N is an integer greater than or equal to 1. For example, the in-vehicle information system is currently connecting to three first mobile terminals, and accordingly divides the screen projection area into three sub-areas. Each sub-area corresponds to one connected first mobile terminal. For each connected first mobile terminal, after a connection between the in-vehicle information system and the corresponding first mobile terminal is established, a data transmission channel is created, and data can be exchanged between the in-vehicle information system and the corresponding first mobile terminal through the data transmission channel.

In some embodiments, the display screen of the in-vehicle information system operating in a screen projection mode may further include a vehicle control panel display area. The screen projection area is configured to display the screen projection data sent from the plurality of connected first mobile terminals, and the vehicle control panel display area is configured to display an in-vehicle information system control panel.

Figure 2:
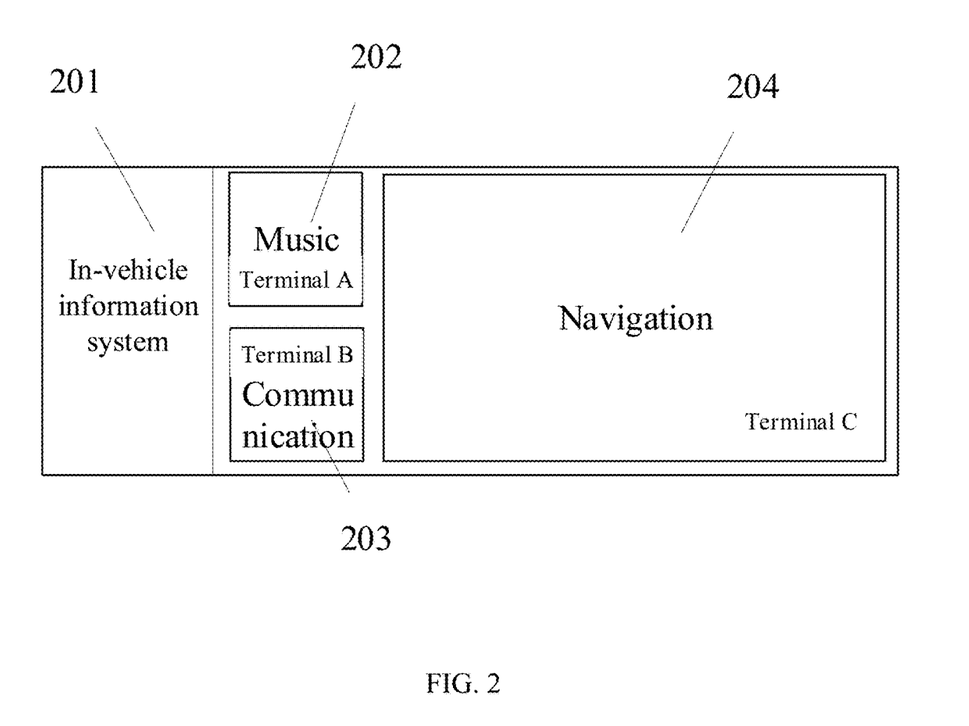
FIG. 2 is a schematic diagram of a first display screen interface according to some embodiments of the present disclosure.

The screen projection data sent from each connected first mobile terminal is also called first screen projection data. The first screen projection data may have different types. FIG. 2 is a schematic diagram of a first display screen interface according to some embodiments of the present disclosure. As shown in FIG. 2, the first display screen interface includes a vehicle control panel display area 201 and a screen projection area. The screen projection area is further divided into a first sub-area 202, a second sub-area 203, and a third sub-area 204. The first sub-area 202 corresponds to a first mobile terminal A and is configured to display (or screen project) music data sent from the first mobile terminal A. The second sub-area 203 corresponds to a first mobile terminal B and is configured to display communication data sent from the first mobile terminal A. The third sub-area 204 corresponds to a first mobile terminal C and is configured to display navigation data sent from the first mobile terminal C.

When a plurality of mobile terminals are present in the vehicle, simultaneous screen projection of the screen projection data sent from the plurality of mobile terminals on the display screen in the in-vehicle information system facilitates simultaneous sharing of contents currently displayed by the plurality of mobile terminals.

During a screen projection process of the in-vehicle information system, a user may be able to perform a certain operation on a sub-area playing the music data or video data to switch music or video to be played in the corresponding sub-area.

At 102, when receiving connection requests from one or more second mobile terminals, the in-vehicle information system establishes connections with the one or more second mobile terminals.

During the screen projection process, the in-vehicle information system may also establish connections with one or more other mobile terminals, i.e., the one or more second mobile terminals. For convenience of description, the one or more second mobile terminals are referred to the second mobile terminals hereinafter. In some embodiments, the "first" in the first mobile terminals and the "second" in the one or more second terminals do not refer to an individual mobile terminal, but rather a category of electronic devices. The first mobile terminals connect with the in-vehicle information system earlier than the one or more second mobile terminals. The one or more second mobile terminals connect with the in-vehicle information system alter than the first mobile terminals.

At 103, second screen projection data sent from the second mobile terminals are received.

The second screen projection data sent from the second mobile terminals are data corresponding to current display interfaces of the second mobile terminals. The current display interfaces of the second mobile terminals may be a navigation interface, a music playing interface, or a video playing interface, etc. Because the display interfaces may display different contents, the corresponding second screen projection data may have different data types. The data types of the second screen projection data may include, but are not limited to, a navigation type, a music type, a video type, and a communication type, etc.

At 104, whether any target screen projection data having the same data type as the second screen projection data exists in the first screen projection data is determined. If it is determined that the first screen projection data includes the target screen projection data that have the same data type as the second screen projection data, 105 is executed. Otherwise, 106 is executed.

The second screen projection data sent from the second mobile terminals and the first screen projection data that have been screen projected on the display screen may have the same data type or different data types.

When the second screen projection data and the first screen projection data sent from a certain first mobile terminal have the same data type, 105 is executed. When the second screen projection data and the first screen projection data sent from each of the first mobile terminals have different data types, 106 is executed.

At 105, a target sub-area corresponding to the target screen projection data is assigned to the corresponding second mobile terminal to display the second screen projection data sent from the corresponding second mobile terminal.

As shown in FIG. 2, the music type data sent from the first mobile terminal A is screen projected to the sub-area 202 on the display screen. If the second screen projection data sent from the newly connected second mobile terminal is the music type data, the second screen projection data may replace the music type data sent from the first mobile terminal A in the sub-area 202.

When the data currently screen projected from the first mobile terminal in the vehicle satisfies the user's need, it is unlikely for the user to connect another second mobile terminal to screen project the same type data. In a case that the second mobile terminal is connected, it is likely that the data currently screen projected from the first mobile terminal is unable to satisfy the user's need and needs to be replaced.

At 106, a new sub-area is added on the display screen to display the second screen projection data sent from the second mobile terminal.

For example, before the second mobile terminal is connected, the display screen is divided into three sub-areas. After the second mobile terminal is connected, the new sub-area is added for the second mobile terminal at 106, and the display screen now includes four sub-areas.

In the method for screen projection in the in-vehicle information system provided by the embodiments of the present disclosure, the display screen is divided into a number of sub-areas corresponding to the number of connected first mobile terminals. The first screen projection data sent from each first mobile terminal is displayed in a corresponding sub-area. During the screen projection process in the in-vehicle information system, the second screen projection data sent from a subsequently connected second mobile terminal may replace the first screen projection data having a same data type as the second screen projection data without the need to add a new sub-area for the second screen projection data sent from the second mobile terminal. In a case that no first screen projection data having the same data type can be replaced, a new sub-area is added for screen projecting the second screen projection data. Thus, the method for screen projection is more flexible and adaptable. Under the circumstance that a large number of mobile terminals are present, the number of sub-areas for screen projection on the display screen in the in-vehicle information system can be reduced, and screen projection quality of each mobile terminal is improved.

In some embodiments, before displaying the first screen projection data sent from each first mobile terminal in the corresponding sub-area of the display screen in the in-vehicle information system, the method further includes the following processes.

At step 1, a display screen division template is presented.

The display screen division template includes a screen projection area and a vehicle control panel display area.

The in-vehicle information system may be pre-configured with a plurality of display screen division templates in advance. Different display screen division templates have different positions and sizes of the screen projection area and the vehicle control panel display area. In actual implementation, thumbnails of the plurality of display screen division templates can be displayed on the display screen at the same time, thereby facilitating the user to compare and select.

At step 2, a selection operation of a target display screen division template by the user is received.

The selection operation may include, but is not limited to, a single-click operation, a double-click operation, and a long-press operation, etc.

At step 3, in response to the selection operation, a division style of the display screen for screen projection in the in-vehicle information system is determined according to the target display screen division template.

The division style of the display screen for screen projection in the in-vehicle information system determines the positions and sizes of the screen projection area and the vehicle control panel display area.

Through allowing the user to determine the division style of the display screen for screen projection in the in-vehicle information system, the user may select the display screen division template according to the actual needs, which can satisfy the user's individual need.

In some embodiments, after the display screen of the in-vehicle information system is divided into sub-areas to display the first screen projection data sent from each first mobile terminal, the method further includes the following processes.

At step 1, an adjustment operation on a sub-area by the user is received.

The adjustment operation includes a first operation of adjusting a size of the sub-area, a second operation of displaying the sub-area in full screen, and a third operation of hiding displaying of the sub-area.

During the screen projection in the in-vehicle information system, the user can adjust any sub-area of the display screen at any time. The first operation may include, but is not limited to, operations such as enlarging, shrinking, adjusting a vertical size, and adjusting a horizontal size of the sub-area. The second operation is used to trigger the in-vehicle information system to display the sub-area in full screen. The second operation may include, but is not limited to, operations such as long press on the sub-area, double-click on the sub-area, and sliding along a first preset track in the sub-area. The third operation is used to trigger the in-vehicle information system to hide the display of the sub-area. The third operation may include, but is not limited to, operations such as sliding operation on the sub-area and sliding along a second preset track in the sub-area.

At step 2, in response to the adjustment operation, the sub-area is adjusted accordingly.

Figure 3:
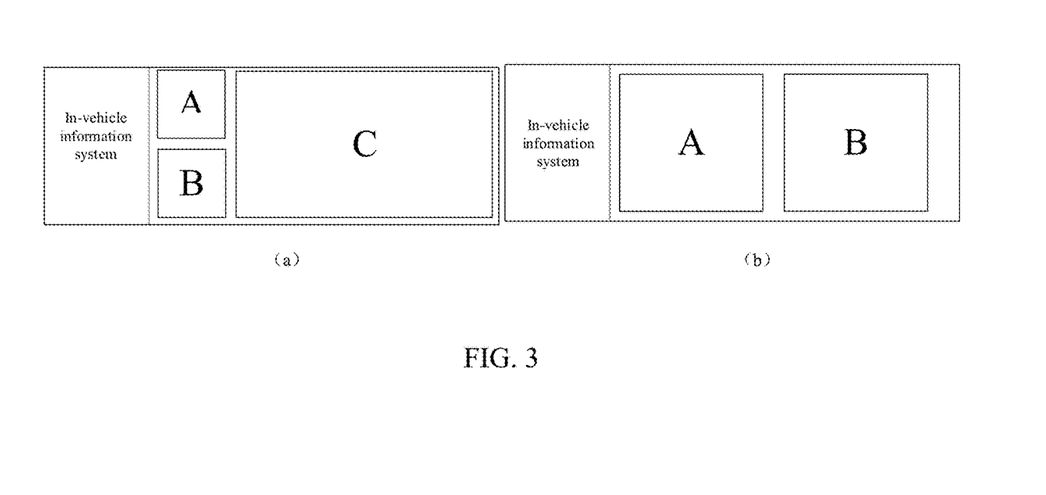
FIG. 3 is a schematic diagram showing a changed display screen interface according to some embodiments of the present disclosure.

The sub-area may be adjusted differently in response to different received adjustment operations. For example, after the second operation on the sub-area is received, the sub-area is displayed in full screen, and other sub-areas and the vehicle control panel display area are hidden from displaying. In another example, after the third operation on the sub-area is received, the sub-area is hidden from displaying, and the sizes of other sub-areas in the screen projection area of the display screen are enlarged accordingly to fill the space previously occupied by the hidden sub-area. FIG. 3 is a schematic diagram showing a changed display screen interface before and after the third operation is performed on a sub-area according to some embodiments of the present disclosure. As shown in FIG. 3(*a*), the screen projection area includes three sub-areas A, B, and C. After the third operation is performed on the sub-area C, as shown in FIG. 3(*b*), the sub-area C is no longer displayed in the screen projection area, and the sub-areas A and B are enlarged.

In this embodiment, the user can flexibly adjust each of the sub-areas to satisfy the individual need of the user.

In some embodiments, the target sub-area corresponding to the target screen projection data is assigned to a second mobile terminal. After the second mobile terminal sends the second screen projection data, the method may further include the following processes.

At step 1, a first input in the target sub-area by the user is received.

After the second screen projection data sent from the second mobile terminal is screen projected in the target sub-area, and the user wants to change and screen project the first screen projection data sent from the first mobile terminal, the processes provided by this embodiment can be performed.

The first input is used to trigger the in-vehicle information system to display identifiers of the mobile terminals corresponding to the target sub-area. The first input may include, but is not limited to, a single-click operation or a long press operation on the target sub-area.

At step 2, in response to the first input, a first identifier of the first mobile terminal and a second identifier of the second mobile terminal corresponding to the target sub-area are displayed.

At step 3, a second input on the first identifier by the user is received.

The second input is used to select a desired identifier. The second input may include, but is not limited to, a single-click operation, a double-click operation, and a long press operation.

At step 4, in response to the second input, the target sub-area is assigned to the first mobile terminal corresponding to the first identifier to screen project the first screen projection data sent from the first mobile terminal corresponding to the first identifier.

In some embodiments, the user may perform simple operations to change the screen projection data in the target sub-area, thereby providing a simple and flexible user experience.

In some embodiments, before the in-vehicle information system divides the display screen to display the first screen projection data sent from the connected first mobile terminals, the method may further include the following processes.

At step 1, the number of the connected first mobile terminals is determined.

The connected first mobile terminals may be represented by N, where N is an integer greater than or equal to 1.

At step 2, the in-vehicle information system divides the screen projection area into a plurality of sub-areas corresponding to the number of the connect first mobile terminals, and displays in the plurality of sub-areas.

At step 3, a configuration operation of the data type corresponding to each sub-area by the user is received.

The configuration operation may include the following processes. The user selects a sub-area to trigger the in-vehicle information system to display data types that can be selected by the user. The user selects the target data type to establish a relationship between the sub-area and the target data type, thereby completing the configuration operation of the data type corresponding to the sub-area.

Figure 4:
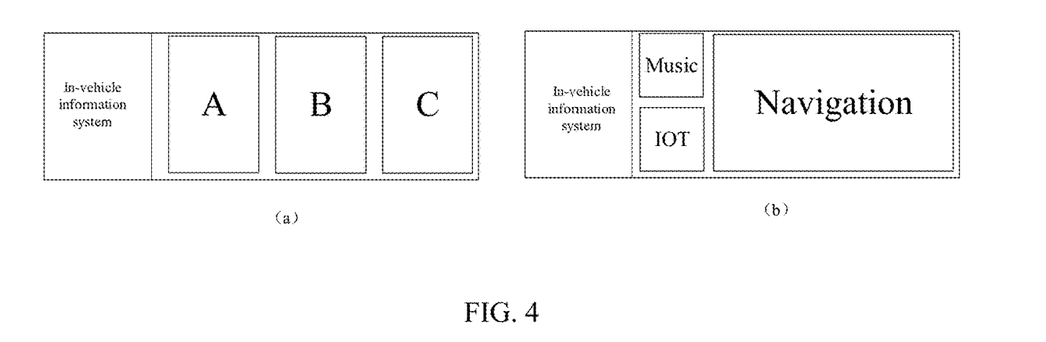
FIG. 4 is a schematic diagram showing another changed display screen interface according to some embodiments of the present disclosure.

The sizes of N sub-areas may be identical or different. In some embodiments, the in-vehicle information system may flexibly adjust the size of the sub-area according to the data type corresponding to the sub-area. FIG. 4 is a schematic diagram showing another changed display screen interface before and after the configuration operation of the data type is performed on a sub-area according to some embodiments of the present disclosure. As shown in FIG. 4(*a*), before the configuration operation of the data type is performed, the sizes of the three sub-areas are identical. As shown in FIG. 4(*b*), after the configuration operation of the data type is performed, the sizes of the three sub-areas are adaptively adjusted according to display requirements of the data types. Specifically, the user configures the music data type for the first sub-area, the Internet of Things (IoT) data type for the second sub-area, and the navigation data type for the third sub-area. Because the navigation type data needs a relatively large area to display, the third sub-area is enlarged while the other two sub-areas are shrunk.

After the configuration operation of the data type for each sub-area is completed, it is ready to screen project the first screen projection data sent from the first mobile terminals to the sub-areas. Based on the data type of the first screen projection data sent from each first mobile terminal, a corresponding sub-area for the first mobile terminal is determined.

In some embodiments, the user may flexibly self-define the data type for each sub-area in the screen projection area to satisfy the individual need of the user.

In some embodiments, after the in-vehicle information system displays the first screen projection data sent from the connected first mobile terminals in the sub-areas of the display screen, the method may further include the following processes.

At step 1, a third input on the divided sub-areas of the display screen by the user is received.

After the in-vehicle information system establishes the connection with the first mobile terminals, the in-vehicle information system simultaneously supports the screen projection of a plurality of services of the first mobile terminals. When the in-vehicle information system simultaneously screen projects the plurality of services of the first mobile terminals, the in-vehicle information system by default only supports the screen projection of the screen projection data of one service for one first mobile terminal. If the user needs to change the service of the first mobile terminal, the processes provided by the embodiment of the present disclosure may be performed.

The third input by the user triggers the in-vehicle information system to display service identifiers for the first mobile terminal corresponding to each of the sub-areas. Each service identifier corresponds to one service.

The service may include, but is not limited to, a music type service, an IoT type service, and a navigation type service. Each service corresponds to one service identifier. The service identifiers may be flexibly configured by those skilled in the art as long as the corresponding services can be distinguished. Details thereof will be omitted herein.

At step 2, in response to the third input, the to-be-projected service identifiers for the first mobile terminal in the corresponding sub-area are displayed.

The to-be-projected service identifiers may include a first service identifier of a first service to which the currently projected first screen projection data belongs, and a second service identifier of a to-be-projected second service which the first mobile terminal maintains in the background.

At step 3, in case that a fourth input of the second service identifier by the user is received, the screen projection data of the second service is displayed to replace the first screen projection data of the first service.

In some embodiments, the user may conveniently change the screen projection service for a same mobile terminal through the simple input operation.

Figure 5:
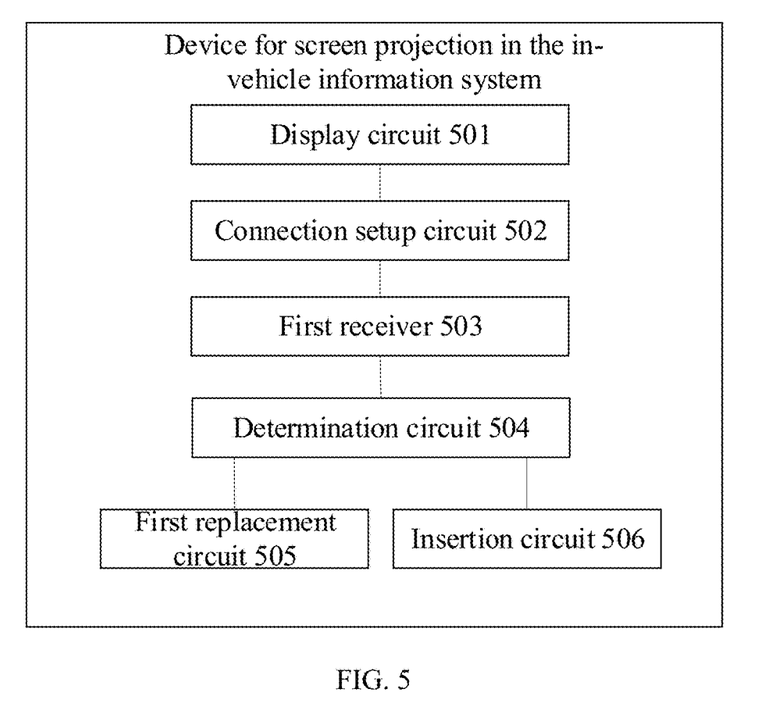
FIG. 5 is a functional block diagram of an exemplary device for screen projection in vehicle according to some embodiments of the present disclosure.

FIG. 5 is a functional block diagram of an exemplary device for screen projection in an in-vehicle information system according to some embodiments of the present disclosure. As shown in FIG. 5, the device for screen projection includes a display circuit 501, a connection setup circuit 502, a first receiver 503, a determination circuit 504, a first replacement circuit 505, and an insertion circuit 506.

Display circuit 501 is configured to divide the display screen of the in-vehicle information system into sub-areas to display the first screen projection data sent from the connected first mobile terminals. The number of the sub-areas divided on the display screen is equal to the number of the connected first mobile terminals.

The connection setup circuit 502 is configured to establish the connection with the second mobile terminals in case the connection requests are received from the second mobile terminals.

The first receiver 503 is configured to receive the second screen projection data sent from the second mobile terminals.

The determination circuit 504 is configured to determine whether any target screen projection data having the same data type as the second screen projection data exists in the first screen projection data.

The first replacement circuit 505 is configured to assign the target sub-area corresponding to the target screen projection data to the second mobile terminal to screen project the second screen projection data sent from the second mobile terminal if the target screen projection data exists.

The insertion circuit 506 is configured to add or insert a sub-area on the display screen to screen project the second screen projection data if no target screen projection data exists.

In some embodiments, the device may further include a presentation circuit, a second receiver, and a style determination circuit. The presentation circuit is configured to present display screen division templates before the display circuit displays the first screen projection data sent from the connected first mobile terminals in the sub-areas on the display screen of the in-vehicle information system. The second receiver is configured to receive a selection operation on a target display screen division template by the user. The style determination circuit is configured to determine a division style of the display screen during the screen projection in the in-vehicle information system according to the target display screen division template in response to the selection operation.

In some embodiments, the device may further include a third receiver and an adjuster. The third receiver is configured to receive an adjustment operation on the sub-area by the user after the display circuit displays the first screen projection data sent from the connected first mobile terminals in the sub-areas on the display screen of the in-vehicle information system. The adjustment operation includes a first operation of adjusting a size of the sub-area, a second operation of displaying the sub-area in full screen, and a third operation of hiding displaying of the sub-area. The adjuster is used to adjust the sub-area in response to the adjustment operation.

In some embodiments, the device may further include a fourth receiver, a first identifier displayer, a fifth receiver, and a second replacement circuit. The fourth receiver is configured to receive the first input in the target sub-area by the user after the first replacement circuit assigns the target sub-area corresponding to the target screen projection data to the second mobile terminal to screen project the second screen projection data sent from the second mobile terminal. The first identifier displayer is configured to display the first identifier of the first mobile terminal corresponding to the target sub-area and the second identifier of the second mobile terminal in response to the first input. The fifth receiver is configured to receive the second input on the first identifier by the user. The second replacement circuit is configured to assign the target sub-area to the first mobile terminal corresponding to the first identifier to screen project the first screen projection data sent from the first mobile terminal corresponding to the first identifier in response to the second input.

In some embodiments, the device may further include a first determination circuit, an area displayer, and a sixth receiver. The first determination circuit is configured to determine the number of the connected first mobile terminals. The area displayer is configured to divide the screen projection area of the display screen into the plurality of sub-areas corresponding to the number of the connected first mobile terminals and to display the plurality of sub-areas. The sixth receiver is configured to receive the configuration operation of the data type corresponding to the sub-area by the user.

In some embodiments, the device may further include a seventh receiver, a second identifier displayer, and an eighth receiver. The seventh receiver is configured to receive the third input on the sub-area by the user after the display circuit displays the first screen projection data sent from the connected first mobile terminals in the sub-areas on the display screen of the in-vehicle information system. The second identifier displayer is configured to display the to-be-projected service identifiers for the first mobile terminal corresponding to the sub-area in response to the third input. The to-be-projected service identifiers may include a first service identifier of a first service to which the currently projected first screen projection data belongs, and a second service identifier of a to-be-projected second service which the first mobile terminal maintains in the background. The eighth receiver is configured to display the screen projection data of the second service to replace the first screen projection data of the first service in case that the fourth input of the second service identifier by the user is received.

The device for screen projection in the in-vehicle information system consistent with the embodiments of the present disclosure is used to implement the method for screen projection in the in-vehicle information system described in the previous embodiments, and inherits the beneficial effects of the corresponding method embodiments. The details thereof are omitted herein.

In the device provided by the embodiments of the present disclosure, the specific manner in which each circuit performs the operations has been described in detail in the method embodiments. The details thereof are omitted herein.

Figure 6:
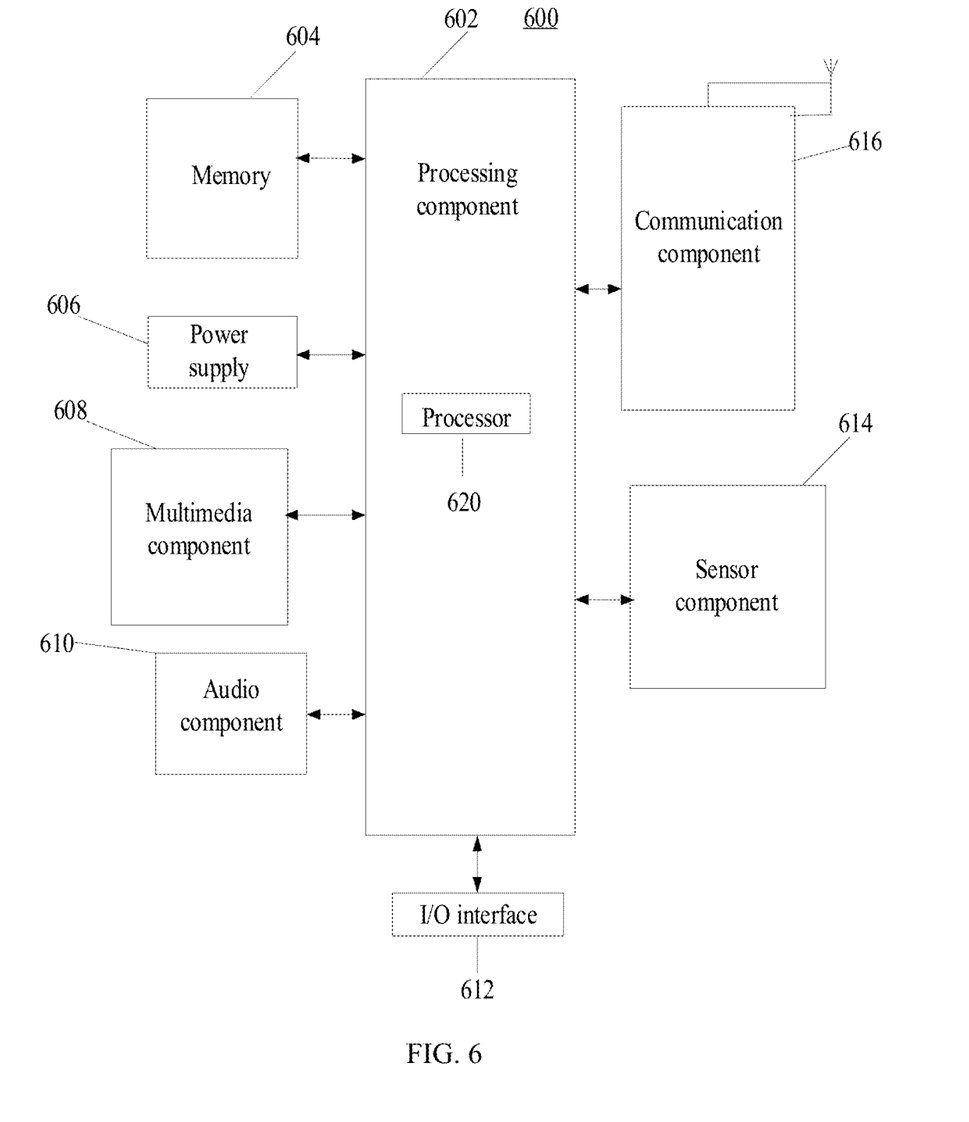
FIG. 6 is a structural block diagram of an exemplary device for screen projection in vehicle according to some embodiments of the present disclosure.

FIG. 6 is a structural block diagram of an exemplary device 600 for screen projection in an in-vehicle information system according to some embodiments of the present disclosure. For example, the device 500 may be an in-vehicle information system.

As shown in FIG. 6, the device 600 includes one or more of: a processing component 602, a memory 604, a power supply 606, a multimedia component 608, an audio component 610, an input/output (I/O) interface 612, a sensor component 614, and a communication component 616.

The processor 602 often controls overall operations of the device 600, such as displaying, making phone calls, data communication, camera operations, and recording operations. The processing component 602 may include one or more processors 620 to execute instructions to perform all or part of the steps of the above-described method. In addition, the processing component 602 may include one or more modules to facilitate interactions between the processing component 602 and other components. For example, the processing component 602 may include a multimedia module to facilitate the interactions between the multimedia component 608 and the processing component 602.

Memory 604 is configured to store various types of data to support the operations of the device 600. The memory 604 may be any type of volatile or no-volatile memory device or combinations thereof, such as a static random-access memory (SRAM), an electronically erasable programmable read-only memory (EEPROM), an erasable programmable read-only memory (EPROM), a programmable read-only memory (PROM), a read-only memory (ROM), a magnetic memory, a flash memory, a magnetic disk, and an optical disk.

The power supply 606 supplies power to the components of the device 600. The power supply 606 may include a power supply management system, one or more power supply, and other components for generating, managing, and distributing power to the components of the device 600.

The multimedia component 608 includes a screen that provides an output interface between the device 600 and the user. In some embodiments, the screen may include a liquid crystal display (LCD) and a touch panel (TP). If the screen includes a touch panel, the screen may be a touch screen to receive input signals from the user. The touch panel includes one or more touch sensors to sense touching, sliding, and gestures on the touch panel. The touch sensors may sense not only boundaries of the touching or sliding, but also time duration and pressure associated with the touching or sliding. In some embodiments, the multimedia component 608 includes a front camera and/or a rear camera. When the device is in an operation mode, e.g., a photo capturing mode or a video recording mode, the front camera and/or the rear camera may receive external multimedia data. Each of the front camera and the rear camera may include an optical lens system with a fixed or adjustable focal length and zooming capability.

The audio component 610 is configured to output and/or input audio signals. For example, the audio component 610 may include a microphone. When the device 600 is in operation mode, e.g., a calling mode, a recording mode, and a voice recognition mode, the microphone is configured to receive external audio signals. The received audio signals may be stored in memory 604 or may be sent out through the communication component 616. In some embodiments, the audio component 610 may further include a speaker configured to output audio signals.

The I/O interface 612 provides the interface between the processing component 602 and peripheral interfaces. The peripheral interfaces may include a keyboard, a click wheel, and a button, etc. The button may include, but is not limited to, a home button, volume buttons, a start button, and a lock button.

The sensor component 614 may include one or more sensors configured to provide status assessments of various aspects of the device 600. For example, the sensor component 614 may detect an on/off status of the device 600, relative positions of various components (e.g., a display and a small keyboard of the device 600). The sensor component 614 may further detect a position change of the device 600 or a component of the device 600, presence or absence of user contact with the device 600, orientation of the device 600, acceleration/deceleration of the device 600, and temperature changes of the device 600. Sensor component 614 may include a proximity sensor configured to detect presence of surrounding objects without any physical contact. The sensor component 614 may further include an optical sensor (e.g., a CMOS or CCD image sensor) for imaging applications. In some embodiments, the sensor component 614 may further include one or more of an acceleration sensors, a gyroscope sensor, a magnetic sensor, a pressure sensor, and a temperature sensor.

The communication component 616 is configured to facilitate wired or wireless communication between the device 600 and other devices. The device 600 may access wireless networks based on communication standards, such as WiFi, 2G/3G/4G/5G mobile, or combinations thereof. In some embodiments, the communication component 616 may receive broadcast signals or broadcast related information from external broadcast systems through broadcast channels. In some embodiments, the communication component 616 may further include a near field communication (NFC) circuit for short range communication. For example, the NFC circuit may be based on radio frequency identification (RFID) technology, infrared data association (IrDA)

technology, ultra-wideband (UWB) technology, Bluetooth (BT) technology, and other technologies.

In some embodiments, the device 600 may be implemented by one or more of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and other electronic components, for performing the above-described method for screen projection in the in-vehicle information system.

The present disclosure also provides non-volatile computer-readable storage medium storing instructions, for example, the memory 604 storing the instructions. The instructions may be executed by processors 620 of the device 600 to implement the method for screen projection in the in-vehicle information system. For example, the non-volatile computer-readable storage medium may be a read-only memory (ROM), a random-access memory (RAM), a CD-ROM, a magnetic tape, a floppy disk, an optical data storage device, and combinations thereof.

The non-volatile computer-readable storage medium stores the instructions. When being executed by the processor of the in-vehicle information system, the instructions stored in the storage medium cause the in-vehicle information system to perform the method for screen projection in the in-vehicle information system. The method includes: dividing the display screen of the in-vehicle information system into the sub-areas to display the first screen projection data sent from the connection first mobile terminals; in response to receiving the connection requests from the second mobile terminals, establishing the connections with the second mobile terminals; receiving the second screen projection data sent from the second mobile terminals; determining whether any target screen projection data having the same data type as the second screen projection data exists in the first screen projection data; in response to a positive determination result, assigning the target sub-area corresponding to the target screen projection data to the second mobile terminal to screen project the second screen projection data sent form the second mobile terminal; and in response to a negative determination result, adding a new sub-area on the display screen to screen project the second screen projection data.

The present disclosure provides the following advantages. The embodiments of the present disclosure provide the screen projection solution for the in-vehicle information system. According to the number of connected first mobile terminals, the display screen is divided into a corresponding number of sub-areas, and the first screen projection data sent from the first mobile terminals are displayed in the sub-areas. During the screen projection process in the in-vehicle information system, the second screen projection data sent from the second mobile terminal connected later can replace the first screen projection data of the same data type without the need of adding an additional sub-area for the second mobile terminal. For the second screen projection data, if there is no first screen projection data of the same data type to be replaced, a new sub-area is added to screen project the second screen projection data. The screen projection method is flexible. In the case that a large number of mobile terminals are present in the vehicle, the number of screen projection sub-areas on the display screen of the in-vehicle information system can be reduced as much as possible, and the screen projection effect of each mobile terminal can be improved.

Other embodiments of the present disclosure are readily apparent to those skilled in the art from consideration of the specification and practice of the embodiments disclosed herein. The specification is intended to cover any modifications, uses or adaptations of the disclosure. The modifications, uses or adaptations follow the general principles of the present disclosure and include common knowledge or conventional technical means in the technical field not disclosed in this disclosure. The embodiments and examples described in the specification are intended to be merely exemplary, with the true scope and spirit of the present disclosure indicated by the appended claims.

It should be understood that the present application is not limited to the particular constructions which have been described above and shown in the accompanying drawings, and various modifications and changes may be made without departing from the scope thereof. The scope of the present disclosure is limited only by the appended claims.

The above descriptions are only some embodiments of the present disclosure, and are not intended to limit the present disclosure. Any modifications, equivalent replacements, improvements, etc. made within the spirit and principles of the present disclosure shall be included within the scope of the present disclosure.

The embodiments in the specification are described in a progressive manner. Each embodiment focuses on the difference from other embodiments, and the same and similar parts of each embodiment can be referred to each other. For the device embodiments, since they are basically similar to the method embodiments, the descriptions are relatively simple, and for the related parts, references can be made to the related parts of the description of the method embodiments.

The above specification provides a detailed introduction to the method for screen projection method in the in-vehicle information system provided by the present disclosure. In the specification, specific embodiments and examples are used to illustrate the principle and implementation of the present disclosure. The descriptions of the above embodiments are merely used to help understand the method of the present disclosure and the operation principles thereof. At the same time, for those of ordinary skill in the art, changes and modifications can be made according to the embodiments of the present disclosure. Thus, the descriptions in the specification shall not be considered to limit the scope of the present disclosure.

The screen projection solution for the in-vehicle information system provided here is not inherently related to any specific computer, virtual system or other device. Various generic systems can also be used based on the teachings in the specification. The structure required to construct a system implementing the solution of the present disclosure is apparent from the above description. Furthermore, the present disclosure is not directed to any particular programming language. It should be understood that various programming languages can be used to implement the embodiments of the present disclosure described herein, and the specific languages in the above description are used to illustrate certain implementations of the present disclosure.

In the description provided herein, numerous specific details are set forth. However, it should be understood that the embodiments of the present disclosure may be practiced without these specific details. In some instances, well-known methods, structures and techniques have not been shown in detail in order not to obscure the understanding of the description.

Similarly, it should be appreciated that in the above description of the embodiments of the present disclosure, in order to streamline the disclosure and to facilitate understanding of one or more of the various aspects of the present disclosure, various features of the present disclosure are sometimes grouped together in one single embodiment, drawing, or the description thereof. This disclosure method, however, shall not be interpreted as reflecting an intention that the claimed disclosure requires more features than are expressly recited in each claim. Rather, as the appended claims reflect, the aspects of the disclosure lie in less than all features of one single foregoing disclosed embodiment. Thus, the claims appended in the specification are hereby expressly incorporated into the detailed description, with each claim standing on its own as a separate embodiment of the present disclosure.

Those skilled in the art should understand that the components and modules in the device embodiments can be adaptively changed and arranged in one or more devices different from the embodiments. Components or modules or units in the embodiments may be combined into one component, module or unit, and furthermore may be divided into a plurality of sub-components, sub-modules or sub-units. All features disclosed in the specification (including accompanying claims, abstract and drawings), as well as any method or methods so disclosed, may be used in any combination, except that at least some of such features and/or processes or units are mutually exclusive. Each feature disclosed in the specification (including accompanying claims, abstract and drawings) may be replaced by alternative features serving the same, equivalent or similar purpose, unless expressly stated otherwise.

In addition, those skilled in the art should appreciate that although some embodiments described herein include some features included in other embodiments but not others, combinations of features from different embodiments are meant to be within the scope of the present disclosure. and form different embodiments. For example, in the claims, any one of the claimed embodiments can be used in any combination.

The various component embodiments of the present disclosure may be implemented in hardware, or in software modules running on one or more processors, or in a combination thereof. Those skilled in the art should understand that a microprocessor or a digital signal processor (DSP) may be used in practice to implement some or all functions of some or all components in the screen projection solution in the in-vehicle information system according to the embodiments of the present disclosure. The present disclosure can also be implemented as an apparatus or apparatus program (e.g., computer program and computer program product) for performing a part or all of the methods described herein. Such a program implementing the present disclosure may be stored on a computer-readable storage medium, or may be in the form of one or more signals. Such a signal may be downloaded from an Internet site, or provided on a carrier signal, or provided in any other forms.

It should be noted that the above-described embodiments illustrate rather than limit the present disclosure, and that those skilled in the art will be able to design alternative embodiments without departing from the scope of the appended claims. In the claims, any reference signs placed between parentheses shall not be construed as limiting the claims. The word "comprising" does not exclude the presence of elements or steps not listed in the claims. The word "a" or "an" preceding an element does not exclude the presence of a plurality of such elements.

The present disclosure may be implemented by means of hardware comprising several distinct elements, and by means of a suitably programmed computer. In a single claim enumerating several means, several of these means can be embodied by one same item of hardware. The use of the words first, second, and third, etc. does not indicate any specific order. These words can be interpreted as descriptive names.

What is claimed is:

1. A method for screen projection in vehicle, comprising:
displaying first screen projection data sent from connected first mobile terminals in sub-areas on a display screen in vehicle, wherein a number of sub-areas divided on the display screen is equal to a number of the first mobile terminals;
in response to receiving a connection request from a second mobile terminal, establishing a connection with the second mobile terminal;
receiving second screen projection data sent from the second mobile terminal;
determining whether any target screen projection data having a same data type which comprises at least one of music data, communication data, and navigation data, as the second screen projection data exists in the first screen projection data;
in response to the determining that the target screen projection data has the same data type, assigning a target sub-area corresponding to the target screen projection data to the second mobile terminal to screen project the second screen projection data sent from the second mobile terminal; and
in response to the determining that the target screen projection data does not have the same data type, adding a new sub-area on the display screen to screen project the second screen projection data; and
adaptively adjusting a size of the new sub-area on the display based on a requirement of a data type.

2. The method according to claim 1, wherein before displaying the first screen projection data sent from the connected first mobile terminals in the sub-areas on the display screen in vehicle, the method further comprises:
presenting display screen division template including a screen projection area and a vehicle control panel display area;
receiving a selection operation on a target display screen division template by a user; and
in response to the selection operation, determining a division of the display screen during a screen projection process in vehicle according to the target display screen division template.

3. The method according to claim 2, wherein before displaying the first screen projection data sent from the connected first mobile terminals in the sub-areas on the display screen in vehicle, the method further comprises:
determining a number of the connected mobile terminals;
dividing the screen projection area of the display screen into a plurality of sub-areas corresponding to the number of the connected first mobile terminals and displaying the plurality of sub-areas; and
receiving a configuration operation of the data type corresponding to the sub-area by the user.

4. The method according to claim 3, wherein:
the configuration operation includes selecting a sub-area to trigger an in-vehicle information system to display data types that can be selected by the user, and selecting a target data type to establish a relationship between the sub-area and the target data type.

5. The method according to claim 1, wherein after displaying the first screen projection data sent from the connected first mobile terminals in the sub-areas on the display screen in vehicle, the method further comprises:
receiving an adjustment operation on the sub-area by a user, wherein the adjustment operation includes a first operation of adjusting a size of the sub-area, a second operation of displaying the sub-area in full screen, and a third operation of hiding displaying of the sub-area; and
in response to the adjustment operation, adjusting the sub-area.

6. The method according to claim 1, wherein after assigning the target sub-area corresponding to the target screen projection data to the second mobile terminal to screen project the second screen projection data sent from the second mobile terminal, the method further comprises:
receiving a first input in the target sub-area by a user;
in response to the first input, displaying a first identifier of the first mobile terminal corresponding to the target sub-area and a second identifier of the second mobile terminal corresponding to the target sub-area;
receiving a second input on the first identifier by the user; and
in response to the second input, assigning the target sub-area to the first mobile terminal corresponding to the first identifier to screen project the first screen projection data sent from the first mobile terminal corresponding to the first identifier.

7. The method according to claim 1, wherein after displaying the first screen projection data sent from the connected first mobile terminals in the sub-areas on the display screen in vehicle, the method further comprises:
receiving a third input on the sub-area by a user;
in response to the third input, displaying to-be-projected service identifiers for the first mobile terminal corresponding to the sub-area, wherein the to-be-projected service identifiers include a first service identifier of a first service to which the currently projected first screen projection data belongs, and a second service identifier of a to-be-projected second service which the first mobile terminal maintains in the background; and
in case that a fourth input of the second service identifier by the user is received, displaying the screen projection data of the second service to replace the first screen projection data of the first service.

8. A device for screen projection in vehicle, comprising:
a memory storing one or more computer programs; and
one or more processors coupled to the memory, wherein when being executed by the one or more processors, the one or more computer programs cause the one or more processors to:
display first screen projection data sent from connected first mobile terminals in sub-areas on a display screen in vehicle, wherein a number of sub-areas divided on the display screen is equal to a number of the first mobile terminals;
in response to receiving a connection request from a second mobile terminal, establish a connection with the second mobile terminal;
receive second screen projection data sent from the second mobile terminal;
determine whether any target screen projection data having a same data type which comprises at least one of music data, communication data, and navigation data, as the second screen projection data exists in the first screen projection data;
in response to the determining that the target screen projection data has the same data type, assign a target sub-area corresponding to the target screen projection data to the second mobile terminal to screen project the second screen projection data sent from the second mobile terminal;
in response to the determining that the target screen projection data does not have the same data type, add a new sub-area on the display screen to screen project the second screen projection data; and
adaptively adjust a size of the new sub-area on the display based on a requirement of a data type.

9. The device according to claim 8, wherein before displaying the first screen projection data sent from the connected first mobile terminals in the sub-areas on the display screen in vehicle, the one or more processors are further configured to:
present display screen division template including a screen projection area and a vehicle control panel display area;
receive a selection operation on a target display screen division template by a user; and
in response to the selection operation, determine a division of the display screen during a screen projection process in vehicle according to the target display screen division template.

10. The device according to claim 9, wherein before displaying the first screen projection data sent from the connected first mobile terminals in the sub-areas on the display screen in vehicle, the one or more processors are further configured to:
determine a number of the connected mobile terminals;
divide the screen projection area of the display screen into a plurality of sub-areas corresponding to the number of the connected first mobile terminals and display the plurality of sub-areas; and
receive a configuration operation of the data type corresponding to the sub-area by the user.

11. The device according to claim 10, wherein:
the configuration operation includes selecting a sub-area to trigger an in-vehicle information system to display data types that can be selected by the user, and selecting a target data type to establish a relationship between the sub-area and the target data type.

12. The device according to claim 8, wherein after displaying the first screen projection data sent from the connected first mobile terminals in the sub-areas on the display screen in vehicle, the one or more processors are further configured to:
receive an adjustment operation on the sub-area by a user, wherein the adjustment operation includes a first operation of adjusting a size of the sub-area, a second operation of displaying the sub-area in full screen, and a third operation of hiding displaying of the sub-area; and
in response to the adjustment operation, adjust the sub-area.

13. The device according to claim 8, wherein after assigning the target sub-area corresponding to the target screen projection data to the second mobile terminal to screen project the second screen projection data sent from the second mobile terminal, the one or more processors are further configured to:
receive a first input in the target sub-area by a user;
in response to the first input, display a first identifier of the first mobile terminal corresponding to the target sub-area and a second identifier of the second mobile terminal corresponding to the target sub-area;
receive a second input on the first identifier by the user; and
in response to the second input, assign the target sub-area to the first mobile terminal corresponding to the first identifier to screen project the first screen projection data sent from the first mobile terminal corresponding to the first identifier.

14. The device according to claim 8, wherein after displaying the first screen projection data sent from the connected first mobile terminals in the sub-areas on the display screen in vehicle, the one or more processors are further configured to:
receive a third input on the sub-area by a user;
in response to the third input, display to-be-projected service identifiers for the first mobile terminal corresponding to the sub-area, wherein the to-be-projected service identifiers include a first service identifier of a first service to which the currently projected first screen projection data belongs, and a second service identifier of a to-be-projected second service which the first mobile terminal maintains in the background; and
in case that a fourth input of the second service identifier by the user is received, display the screen projection data of the second service to replace the first screen projection data of the first service.

15. A non-transitory computer-readable storage medium storing computer instructions, wherein when being executed by a processing component, the computer instructions cause the processing component to perform:
displaying first screen projection data sent from connected first mobile terminals in sub-areas on a display screen in vehicle, wherein a number of sub-areas divided on the display screen is equal to a number of the first mobile terminals;
in response to receiving a connection request from a second mobile terminal, establishing a connection with the second mobile terminal;
receiving second screen projection data sent from the second mobile terminal;
determining whether any target screen projection data having a same data type which comprises at least one of music data, communication data, and navigation data, as the second screen projection data exists in the first screen projection data;
in response to the determining that the target screen projection data has the same data type, assigning a target sub-area corresponding to the target screen projection data to the second mobile terminal to screen project the second screen projection data sent from the second mobile terminal;
in response to the determining that the target screen projection data does not have the same data type, adding a new sub-area on the display screen to screen project the second screen projection data; and
adaptively adjusting a size of the new sub-area on the display based on a requirement of a data type.

16. The non-transitory computer-readable storage medium according to claim 15, wherein before displaying the first screen projection data sent from the connected first mobile terminals in the sub-areas on the display screen in vehicle, the processing component is further configured to perform:
presenting display screen division template including a screen projection area and a vehicle control panel display area;
receiving a selection operation on a target display screen division template by a user; and
in response to the selection operation, determining a division of the display screen during a screen projection process in vehicle according to the target display screen division template.

17. The non-transitory computer-readable storage medium according to claim 16, wherein before displaying the first screen projection data sent from the connected first mobile terminals in the sub-areas on the display screen in vehicle, the processing component is further configured to perform:
determining a number of the connected mobile terminals;
dividing the screen projection area of the display screen into a plurality of sub-areas corresponding to the number of the connected first mobile terminals and displaying the plurality of sub-areas; and
receiving a configuration operation of the data type corresponding to the sub-area by the user.

18. The non-transitory computer-readable storage medium according to claim 15, wherein after displaying the first screen projection data sent from the connected first mobile terminals in the sub-areas on the display screen in vehicle, the processing component is further configured to perform:
receiving an adjustment operation on the sub-area by a user, wherein the adjustment operation includes a first operation of adjusting a size of the sub-area, a second operation of displaying the sub-area in full screen, and a third operation of hiding displaying of the sub-area; and
in response to the adjustment operation, adjusting the sub-area.

19. The non-transitory computer-readable storage medium according to claim 15, wherein after assigning the target sub-area corresponding to the target screen projection data to the second mobile terminal to screen project the second screen projection data sent from the second mobile terminal, the processing component is further configured to perform:
receiving a first input in the target sub-area by a user;
in response to the first input, displaying a first identifier of the first mobile terminal corresponding to the target sub-area and a second identifier of the second mobile terminal;
receiving a second input on the first identifier by the user; and
in response to the second input, assigning the target sub-area to the first mobile terminal corresponding to the first identifier to screen project the first screen projection data sent from the first mobile terminal corresponding to the first identifier.

20. The non-transitory computer-readable storage medium according to claim 15, wherein after displaying the first screen projection data sent from the connected first mobile terminals in the sub-areas on the display screen in vehicle, the processing component is further configured to perform:
receiving a third input on the sub-area by a user;
in response to the third input, displaying to-be-projected service identifiers for the first mobile terminal corresponding to the sub-area, wherein the to-be-projected service identifiers include a first service identifier of a first service to which the currently projected first screen projection data belongs, and a second service identifier of a to-be-projected second service which the first mobile terminal maintains in the background; and in case that a fourth input of the second service identifier by the user is received, displaying the screen projection data of the second service to replace the first screen projection data of the first service.

* * * * *